(No Model.)
W. H. RYTHER.
DEVICE FOR CONVERTING RECIPROCATING INTO ROTARY MOTION.
No. 255,735.
Patented Mar. 28, 1882.
2 Sheets—Sheet 1.
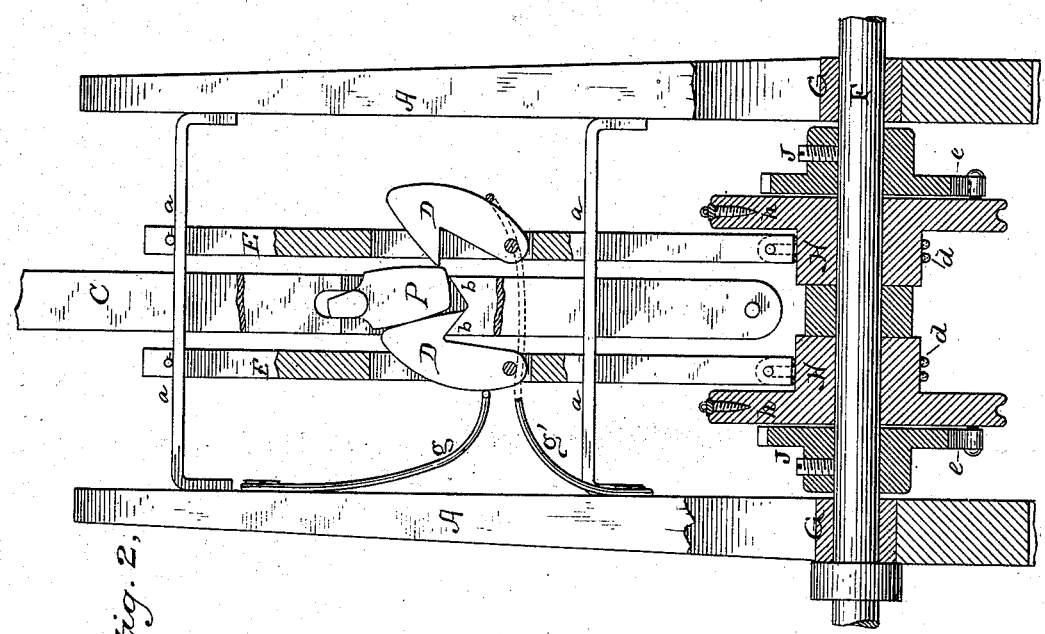
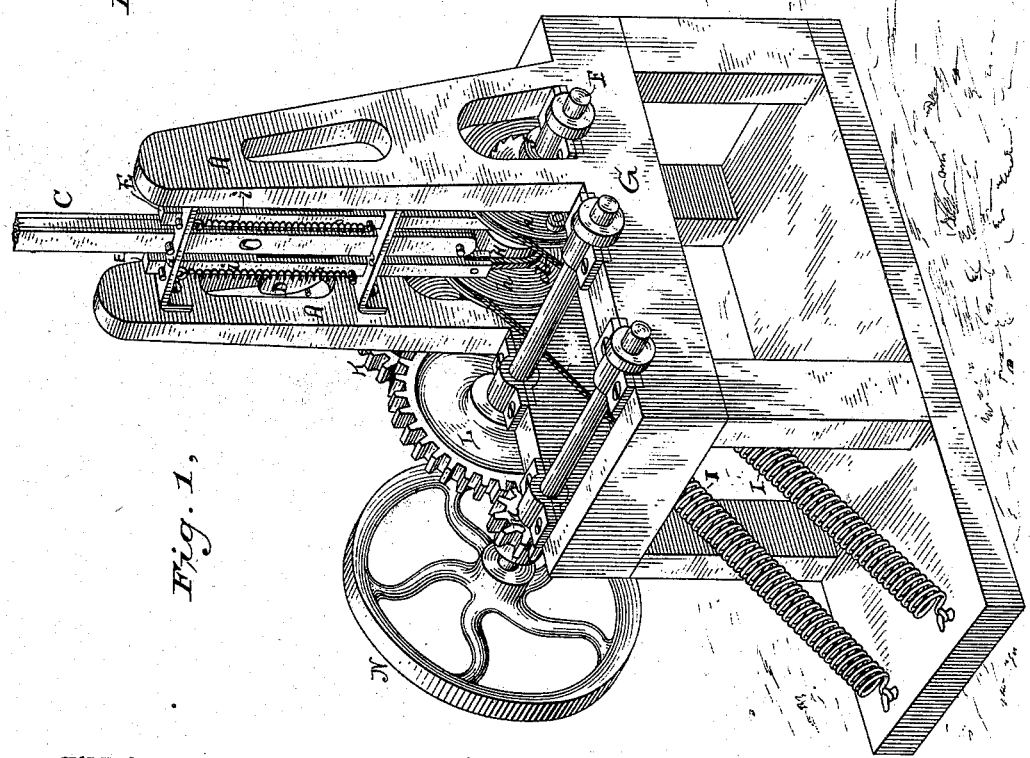
WITNESSES
R. W. Smith
Aug. Jordan
By Attorney
INVENTOR
William H. Ryther
By his atty
R. D. O. Smith
N. PETERS. Photo-Lithographer, Washington, D. C.

(No Model.)
W. H. RYTHER.
DEVICE FOR CONVERTING RECIPROCATING INTO ROTARY MOTION.
No. 255,735. Patented Mar. 28, 1882.
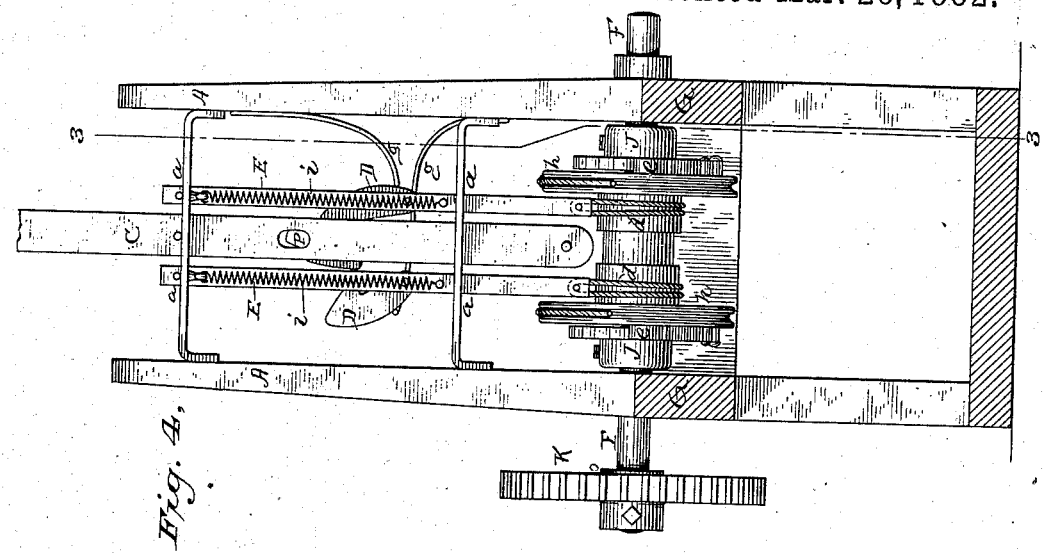
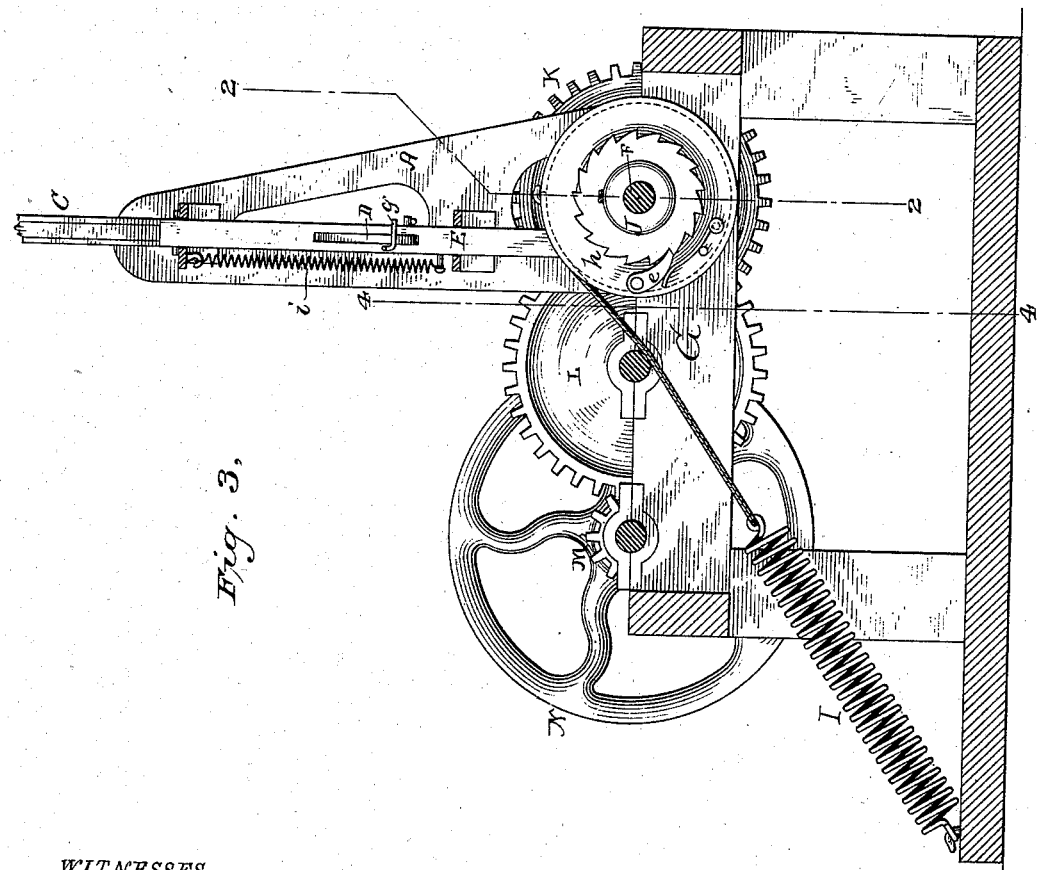
WITNESSES
INVENTOR
William H Ryther

UNITED STATES PATENT OFFICE.

WILLIAM H. RYTHER, OF SOMONAUK, ILLINOIS, ASSIGNOR TO CLARK & CO., OF SAME PLACE.

DEVICE FOR CONVERTING RECIPROCATING INTO ROTARY MOTION.

SPECIFICATION forming part of Letters Patent No. 255,735, dated March 28, 1882.

Application filed September 23, 1880. Renewed September 12, 1881. (No model.)

*To all whom it may concern:*

Be it known that I, WILLIAM H. RYTHER, of Somonauk, in the county of De Kalb and State of Illinois, have invented a new and useful Device for Converting Reciprocations into Rotary Motion, applicable to the propulsion of rotary machines by power derived from the pitman of a wind-wheel, &c.; and I do hereby declare that the following is a full and exact description of the same.

The principal points of advantage of my machine may be stated as follows: First, a continuous uniform rotary motion is obtained from a reciprocatory motion which may be fluctuating in speed; second, when from any cause the wind-wheel or the rotary converter ceases to operate, the pitman and the rotary converter become automatically detached from each other; third, the rotary motion obtained is more uniform than the reciprocation of the driving-pitman; fourth, the rotary motion is continuous without adding any device whereby the governing of the wheel may possibly be prevented; fifth, the power to propel the machinery resides in two or more weights or springs which are flexed by the rotation of the driving-shaft operated by the wind-wheel, so that the propelling-power for the machinery is constant, notwithstanding the motion of the wind-wheel may be inconstant.

My invention consists, first, in the peculiar devices whereby the reciprocating part may be automatically detached from the rotary part upon the arrest of either; second, in the method whereby the reciprocating pitman acts only upon the rotary to wind up or flex the impelling-springs without acting directly upon the mechanism which impels the driven machines; third, in the device by which the dogs or clutches attach and detach themselves to or from the pitman; fourth, the peculiar construction of the ratchet-plates and chain or band wheels, whereby the same is adapted to any size of wheel and any length of crank-shaft stroke; fifth, the clutch-shaft with devices which cause one or both to go out of action when not required.

That others may fully understand my invention, I will particularly describe it, having reference to the accompanying drawings, wherein—

Figure 1 is a perspective view of my device in operative position. Fig. 2 is a central transverse sectional elevation of the same on line 2 2. Fig. 3 is a longitudinal sectional elevation on line 3 3. Fig. 4 is a transverse sectional elevation on line 4 4.

The wind-wheel, which may be of any proper construction, is supported upon a frame-work as usual.

C is the pitman of said wind-wheel, driven by the crank-shaft of the wheel and communicating a reciprocating motion to the mechanism below. The lower end of the pitman C moves in guides $a$ $a$, and is provided on each side with clips or notches $b$ $b$, to engage with hooking-pawls D D, which are hung in the reciprocating bars E E, which also move in the guides $a$ $a$, parallel with the pitman C.

A transverse shaft, F, is mounted in the frame G below the pitman C, and said shaft is provided with two drums, H, upon which are wound chains or cords $d$, the outer ends whereof are attached to the lower ends of the bar E, so that when said bars are drawn up said drums will be caused to rotate upon said shaft. Each drum H is provided at one end with a grooved flange or pulley, $h$, upon which is wound a cord or chain, the outer end of which is connected to the propelling-spring I. Outside of each pulley $h$ there is a flanged collar, J, the edge of which is formed with ratchet-teeth, and a pawl, $e$, is placed upon the pulley $h$, to engage with said teeth. The effect of this arrangement is to permit the drum H to revolve backward freely when the bar E is drawn up, but to cause the shaft F to revolve with it when the spring I retracts and causes said drum to revolve forward again. In that way the spring I is alternately flexed and released, and as there are two or more of said springs, they may be brought alternately into action, and thus maintain a constant pressure to revolve the shaft F.

By means of a train, K, L, M, &c., the motion of the shaft F may be speeded up or down, as desired, and the machinery to be propelled may be connected with any member of said train.

N is a fly-wheel to equalize the motion.

The dogs D have heavy backs or are provided with springs, so that they fall backward out of engagement with the clips b b as soon as they are liberated, and remain out of engagement until by the descent of the bar E they are again thrown forward by some positive means. This may be by a cam-surface attached to the side of the frame or by a spring, g. A swinging gate, P, may be hung between the clefts b, to be alternately pushed aside by the pawls D as they enter and engage said cleft, and thereby to prevent the engagement of more than one pawl at the same time. The springs i i support the bars E E and keep the cords or chains d d always taut, and therefore keep the dogs D out of engagement until the power of the spring I is nearly exhausted. If, therefore, the machinery is slow running, the pitman, after having lifted both bars E, may make several reciprocations without effecting any work; but usually one of said rods will be lifted at each reciprocation.

The mechanism as above described is supported to stand directly beneath the wind-wheel; but this location may not always be convenient. The direction of the pitman C may be changed from vertical to horizontal, as desired, by means of a bell-crank, and the position of the rotary mechanism will then be correspondingly changed.

Having described my invention, what I claim as new is—

1. The reciprocating bar C, provided with the clips b b, combined with the bars E E, each provided with the dogs D D, springs g and i, chain or cords d, and drums H, as set forth.

2. The reciprocating bar C, provided with clips b b, combined with the reciprocating bars E E, provided with dogs D D, weighted at the back, so as to fall out of engagement, and spring g, near the bottom of the reciprocation, to push said dogs into position for engagement, as set forth.

3. A device for converting motion, to be placed intermediately between the prime mover and the machine to be driven, provided with springs or weights whereby the machinery may be driven, and winding-drum actuated by the reciprocation of the prime mover, whereby the motion imparted to the driver-machine is not made irregular by fluctuations of speed of the prime mover.

4. A motor actuated by springs or weights combined with mechanism driven by a reciprocating pitman, whereby during the operation of said motor said springs or weights are being constantly wound up and their tension renewed.

5. The reciprocating bars E E and the dogs D D, combined with the reciprocating bar C, provided with clips b b, and the intermediate swinging gate, P, for the purpose set forth.

6. A reciprocating bar or pitman, C, combined with two parallel alternately-reciprocating bars, E E, provided with mechanism whereby said bars will be alternately engaged with said pitman to be actuated thereby, and connected with said bar E rotary reciprocating drums mounted upon a revolving shaft, with automatic clutches and retracting springs or weights, whereby the alternating reciprocation of said bars E E and their connected drums is converted into a continuous rotation of said shaft, as set forth.

7. The reciprocating bar C, provided with the clips b b, combined with the bars E E, each provided with the dogs D D, springs g g and i i, chains or cords d d, and drums H H, as and for the purpose set forth.

WILLIAM H. RYTHER.

Witnesses:
H. WRIGHT,
JOHN CLARK.